(12) United States Patent
Isobe et al.

(10) Patent No.: US 8,405,718 B2
(45) Date of Patent: Mar. 26, 2013

(54) IMAGE TAKING SYSTEM AND LENS APPARATUS

(75) Inventors: Shingo Isobe, Utsunomiya (JP); Takayuki Kikuchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 406 days.

(21) Appl. No.: 12/613,332

(22) Filed: Nov. 5, 2009

(65) Prior Publication Data
US 2010/0110178 A1 May 6, 2010

(30) Foreign Application Priority Data
Nov. 5, 2008 (JP) .................................. 2008-283930

(51) Int. Cl.
*H04N 7/18* (2006.01)
(52) U.S. Cl. ........................ 348/135; 348/142
(58) Field of Classification Search .................. None
See application file for complete search history.

(56) References Cited

U.S. PATENT DOCUMENTS
6,438,491 B1 * 8/2002 Farmer ..................... 701/301
6,853,738 B1 * 2/2005 Nishigaki et al. .............. 382/106
2008/0024649 A1 * 1/2008 Okawara ....................... 348/347

FOREIGN PATENT DOCUMENTS
JP 6-331883 A 12/1994
JP 2003-329915 A 11/2003

* cited by examiner

*Primary Examiner* — John B. Walsh
(74) *Attorney, Agent, or Firm* — Rossi, Kimms & McDowell LLP

(57) ABSTRACT

An image taking system comprises a distance calculator 114 which calculates an object distance in each of a plurality of ranging areas 1 to 16, a velocity calculator 116 which calculates an object velocity in each of the ranging areas, an information generator 114, 116 which generates object information indicating at least one of the object distance, a difference between the object distances, the object velocity, and a difference between the object velocities, an extractor 117 which extracts a ranging area where the object velocity calculated by the velocity calculator is in a first range SA out of the plurality of ranging areas, and an output image generator 203 which generates an output image including a shot image generated by the camera and the object information corresponding to the ranging area extracted by the extractor.

15 Claims, 8 Drawing Sheets

IMAGE TAKING SYSTEM AND LENS APPARATUS

BACKGROUND OF THE INVENTION

1. Field of the Invention

The present invention relates to an image taking system and a lens apparatus which have a ranging function.

2. Description of the Related Art

In a live telecast of marathon, the distance between a top runner and a second runner is often announced. The distance between the runners at this time may be a rough distance which has been measured by eye of an announcer or a reporter, or may be a distance which has been calculated by using the time from the top runner has passed through until the second runner passes through a certain point and the running velocity of each runner. Therefore, the distance between the runners given by the announcer or the reporter is not precise. Further, viewers can not visually recognize the distance by just being given to the viewers by the announcer or the reporter.

Japanese Patent Laid-open No. 2003-329915discloses an image taking system as described below. First, a focusing is manually performed for a first object, and a distance to the first object is calculated based on a position of a focus lens at the time of being in an in-focus state. Next, similarly to the case of the first object, a focusing is manually performed for a second object, and a distance to the second object is calculated based on a position of the focus lens at the time of being in the in-focus state. Then, the difference between the calculated first and second object distances is obtained to superimpose the difference information with a video signal to display it.

Japanese Patent Laid-open No. 6-331883 discloses a ranging system as described below. The ranging system irradiates light for ranging to a plurality of objects corresponding to a plurality of ranging points, and calculates a distance to the object at each ranging point by receiving reflected light from each object. Further, the plurality of ranging points are divided into a plurality of groups based on distributions of the positions and the calculated distances. A group which has a size smaller than a predetermined size among the plurality of groups are regarded as an in-focus state group, and a focus control is performed based on the calculated distance of the in-focus state group.

However, in an image taking system disclosed in Japanese Patent Laid-open No. 2003-329915, in order to calculate the distances of the first and second objects, a focusing has to be performed for each of the first and second objects. In other words, the distance to the second object can not be calculated while the in-focus state for the first object that is a main shot target is maintained.

In the image taking system, since the distance between both objects is obtained after the distance to the first object is calculated and the focusing is performed for the second object, a real distance between the objects may change before the distance between the objects is obtained. In other words, when the real distance between the objects changes from moment to moment in a marathon race or the like, the distance between the objects which rapidly reflects the changes can not be calculated.

In a ranging system disclosed in Japanese Patent Laid-open No. 6-331883, it is possible to calculate the object distances at the plurality of ranging points regardless of the current in-focus state. However, it is necessary to select a targeted object out of the plurality of ranging points. In addition, in the ranging system, although one group is selected out of a plurality of groups, at least two objects (runners) needs to be selected in performing a distance display in a marathon live or the like. Further, it is often the case that a person who is not a runner or an object that has a size similar to a person, other than a main object that is a runner, is shot at the same time. Therefore, it is difficult to determine whether or not it is the main object (runner) based on the size of the group.

BRIEF SUMMARY OF THE INVENTION

The present invention provides an image taking system and a lens apparatus configured to be able to automatically select a main object out of a plurality of objects and to display object information such as a distance to the main object or a velocity of the object.

An image taking system as one aspect of the present invention includes a lens apparatus and a camera configured to take an image using the lens apparatus. The image taking system comprises a distance calculator configured to calculate an object distance from the lens apparatus in each of a plurality of ranging areas provided in an image taking range, a velocity calculator configured to calculate an object velocity based on the object distance calculated by the distance calculator in each of the plurality of ranging areas, an information generator configured to generate object information indicating at least one of the object distance calculated by the distance calculator, a difference between the object distances, the object velocity calculated by the velocity calculator, and a difference between the object velocities, an extractor configured to extract a ranging area where the object velocity calculated by the velocity calculator is in a first range out of the plurality of ranging areas; and an output image generator configured to generate an output image including a shot image generated by the camera and the object information corresponding to the ranging area extracted by the extractor.

A lens apparatus as another aspect of the present invention includes the distance calculator, the velocity calculator, the information generator, and the extractor.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Embodiment 1

Figure 1:
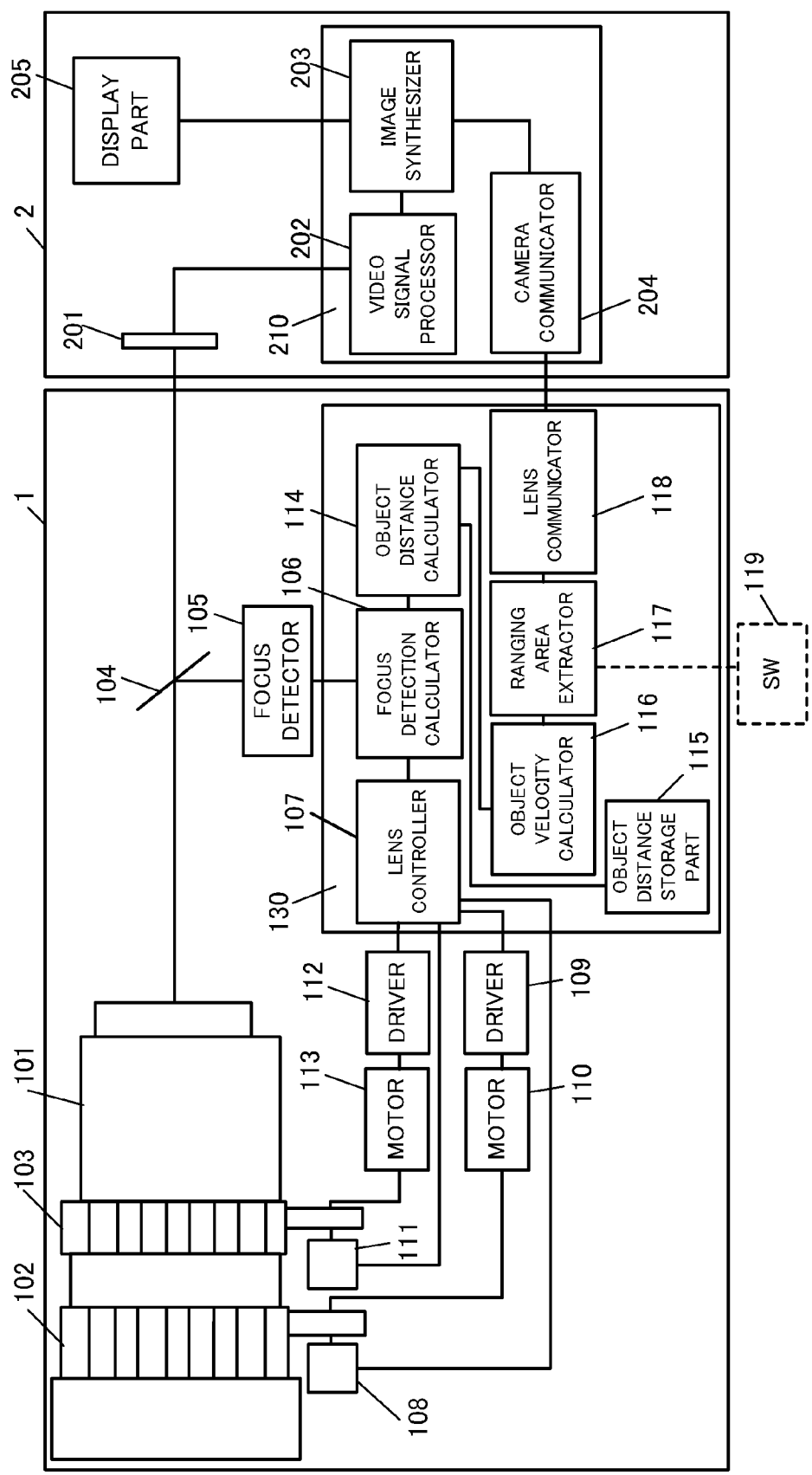
FIG. 1 is a block diagram showing a configuration of an image taking system that is Embodiment 1 of the present invention.

FIG. 1 shows a configuration of an image taking system that is Embodiment 1 of the present invention. The image taking system includes a lens apparatus 1 and a video camera 2. The lens apparatus (the lens apparatus for taking an image of an object) 1 is detachable (interchangeable) with respect to the camera 2.

In the camera 2, reference numeral 201 denotes an image pickup element (hereinafter, referred to as a CCD) which is constituted by a CCD sensor, a CMOS sensor, or the like.

In the lens apparatus 1, reference numeral 101 denotes a lens barrel and the lens barrel 101 includes an image taking optical system including an optical adjusting member such as a focus lens, a magnification-varying lens and an iris (not shown). The image taking optical system is a so-called front-focus type system where the focus lens is arranged at a position closest to an object side in the image taking optical system.

The lens barrel 101 is provided with a focus driving ring 102 which transmits a driving force from a focus motor 110 to a focus lens to move the focus lens in an optical axis direction. Further, the lens barrel 101 is provided with a zoom driving ring 103 which transmits a driving force from a zoom motor 113 to a magnification-varying lens to move the magnification-varying lens in the optical axis direction.

A half mirror 104 is provided behind the lens barrel 101 (image plane side) in the lens apparatus 1. A light beam from the object which has passed through the lens barrel 101, i.e. which has entered the lens apparatus 1, and has reached the half mirror 104 is divided into a light beam transmitting through the half mirror 104 and a light beam reflected by the half mirror 104.

The light beam transmitting through the half mirror 104 enters the CCD 201. The light beam reflected by the half mirror 104 enters a focus detector 105 which is provided at a position conjugate with the CCD 201 in the lens apparatus 1.

Figure 2:
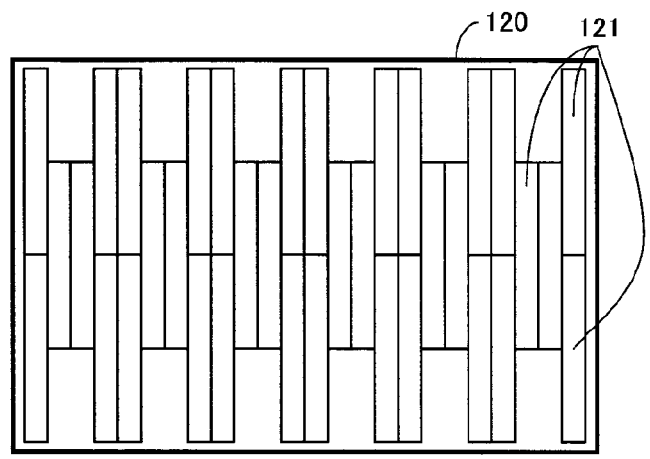
FIG. 2 is a diagram showing a configuration of an AF sensor in Embodiment 1.

The focus detector 105 includes a plurality of pairs of secondary image-forming lenses (not shown) and an AF sensor 120 as a phase difference sensor shown in FIG. 2. A plurality of pairs of line sensors (linearly-arranged photoelectric conversion elements) 121 which correspond to a plurality of ranging areas previously set in an image taking range (image-taking screen) that is a photographable range by the camera 2 via the lens apparatus 1 are provided on the AF sensor 120.

A pair of object images (hereinafter, referred to as two images) is formed on each pair of line sensors 121 by the light beams reflected by the half mirror 104 and divided into two by each pair of secondary image-forming lenses. Each pair of line sensors 121 performs a photoelectric conversion of the two images to output two image signals. The two images, i.e. the two image signals, have a phase difference in accordance with a focus state of the lens apparatus 1 (the image taking optical system).

When the lens apparatus 1 is in an in-focus state, the phase difference corresponding to an interval between the two images (between objects) shows a specific value. When the lens apparatus 1 is in a front focus state, the phase difference is smaller than the specific value. On the other hand, when the lens apparatus 1 is in a rear focus state, the phase difference is greater than the specific value. Thus, the focus detector 105 (AF sensor 120) has a function that detects a phase difference between objects (two images) formed by light which has entered the lens apparatus 1.

The two image signals from each pair of line sensors 121 are inputted to a focus detection calculator 106. The focus detection calculator 106 performs a correlation calculation with respect to the two image signals to calculate the phase difference between the image signals to calculate a defocus value of the lens apparatus 1 based on the phase difference. Thus, a plurality of defocus values corresponding to the plurality of line sensors 121 provided on the AF sensor 120 are calculated. The calculated plurality of defocus values are inputted to a lens controller (a focus controller) 107 and an object distance calculator (a distance calculator, a distance information generator, and a ranging position output device) 114.

In the lens apparatus 1 of the present embodiment, when a manual focusing which will be described below is performed for an object by a user, a highly-accurate AF focusing is performed for the object. Therefore, the lens controller 107 selects the smallest defocus value from the inputted plurality of defocus values as an AF defocus value.

The user may arbitrarily select an AF area (a focus detecting area) that is a ranging area for which a focusing is to be performed from the plurality of ranging areas by the operation of an operating member such as an arrow key. In this case, a defocus value obtained by using a pair of line sensors included in the AF area is calculated as an AF defocus value.

The lens controller 107 detects a rotational position of the focus driving ring 102, i.e. a position of the focus lens, via a focus position detector 108. The lens controller 107 also detects a rotational position of the zoom driving ring 103, i.e. a position of the magnification-varying lens, via a zoom position detector 111.

The lens controller 107 calculates a moving distance of the focus lens based on detected positions of the focus lens and the magnification-varying lens and the AF defocus value. The moving distance is a moving distance of the focus lens for obtaining the in-focus state with respect to objects whose two images are formed on a pair of line sensors 121 which have outputted image signals which are bases for calculating the AF defocus value.

The lens controller 107 drives the focus motor 110 via a focus driver 109 to rotate the focus driving ring 102 so that the focus lens moves in an optical axis direction by the calculated moving distance. Thus, the AF (auto-focus) is performed.

In the lens apparatus 1 of the present embodiment, a focus command signal from a focus operating member (a focus switch, not shown) which is operated by the user is inputted to the lens controller 107. The lens controller 107 drives the focus motor 110 via the focus driver 109 in accordance with the focus command signal to rotate the focus driving ring 102. Thus, the manual focusing is performed by a servo control.

Further, a zoom command signal from a zoom operating member (zoom switch, not shown) which is operated by the user is inputted to the lens controller 107. The lens controller 107 drives the zoom motor 113 via a zoom driver 112 to rotate the zoom driving ring 103 in accordance with the zoom command signal. Thus, the magnification-varying lens moves and the manual zooming is performed by the servo control.

Figure 3:
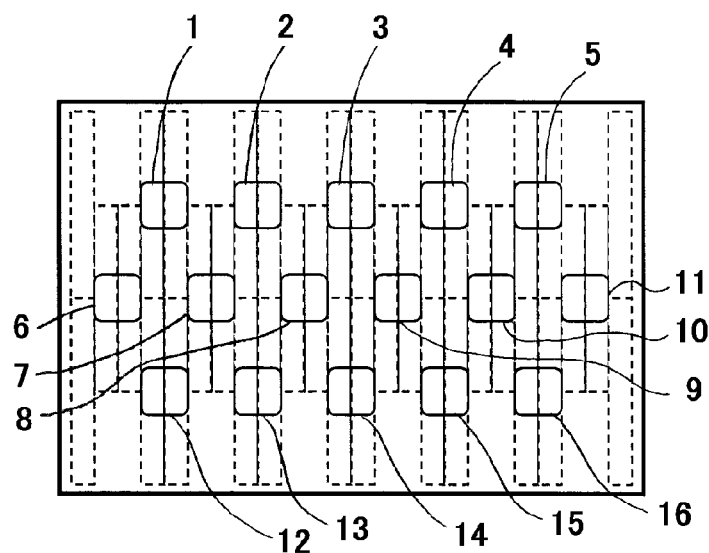
FIG. 3 is a diagram showing an example of ranging areas in Embodiment 1.

FIG. 3 shows an example of setting ranging areas in the image taking range. An object distance calculator 114 stores a plurality of positions of ranging areas (coordinates, coordinates in the image taking range, and position information corresponding to the coordinates in an image-taking screen or the like) and a shape (size) of the ranging areas.

FIG. 3 shows an example in which ten ranging areas where five out of the ten ranging areas are in line in a lateral direction in each of the upper part and the lower part of the image taking range, and six ranging areas which is in line in the lateral direction in the middle in an upward and downward direction are arranged. Ranging areas 1 to 5, ranging areas 6 to 11, and ranging areas 12 to 16 are arranged so as to be in order from the upper left, in order from the left in the middle of the image taking range, and in order from the lower left, respectively. When the setting in the object distance calculator 114 is changed, at least one of the positions, the sizes, and the number of the ranging areas can also be changed. Therefore, in the AF sensor 120 shown in FIG. 2, a lot of line sensors 121 are arranged so that the user can select the positions, the sizes, or the number of the ranging areas in the image taking range with high degree of freedom.

Each ranging area is set so as to include the plurality of pairs of line sensors 121. In FIG. 3, the line sensors 121 shown in FIG. 2 are indicated by dotted lines.

A plurality of defocus values obtained by using the plurality of pairs of line sensors 121 on the AF sensor 120 are inputted from the focus detection calculator 106 to the object distance calculator 114. The object distance calculator 114 calculates a distance to the object (object distance) for each ranging area based on the defocus value obtained by using one pair of line sensors 121 selected out of the plurality of pairs of line sensors 121 included in each ranging area as follows. In other words, the object distance is calculated based on the output of the AF sensor 120 that is a phase difference sensor.

In the embodiment, the object distance represents a distance between the lens apparatus 1 (an incident surface of the image pickup element or a surface of a lens arranged at a position closest to the object) and the object. A method of selecting "the pair of line sensors 121" will be described below. When the AF sensor 120 is used as a sensor for calculating a defocus value used for an AF (focus control) and a sensor for calculating the object distance, the configuration of the lens apparatus 1 can be simplified as compared with the case where these are separately provided.

The object distance calculator 114 loads a defocus value for each ranging area, a current focus lens position detected by the focus position detector 108, and a current magnification-varying lens position detected by the zoom position detector 111. Subsequently, the object distance calculator 114 calculates a focus lens position which is an in-focus position with respect to the object included in the ranging area (in-focus lens position) from the defocus value and the current focus lens position. Further, the object distance calculator 114 calculates the object distance based on the in-focus lens position and the current magnification-varying lens position.

In FIG. 1, a line which connects the object distance calculator 114 with the focus position detector 108 and the zoom position detector 111 is omitted.

The object distance storage part 115 stores the object distance in each ranging area calculated by the object distance calculator 114.

An object velocity calculator (the velocity calculator) 116 calculates an object distance velocity that is a moving velocity (a relative velocity) of the object in each ranging area with respect to the lens apparatus 1. Specifically, the object velocity is calculated based on a difference between a current object distance in each ranging area calculated by the object distance calculator 114 and the previous object distance (the object distance a predetermined time ago as compared with a current time) in each ranging area stored by the object distance storage part 115.

A ranging area extracting part (extractor) 117 extracts a ranging area that is a target (extraction target: hereinafter referred to as an information display target) for generating object information superimposed with a shot image generated by the camera 2 out of the ranging areas 1 to 16. The ranging area extracting part 117 stores an extraction condition that is criteria for the extraction. The extraction condition ill be described below.

The "object information" in the embodiment means at least one of the object distance calculated by the object distance calculator 114, the difference between the object distances (relative distance), the object velocity calculated by the object velocity calculator 116, and the difference between the object velocities (relative velocity). In the present embodiment, the object distance (also referred to as object distance information) as object information is superimposed with a shot image.

The ranging area extracting part 117 is connected with a lens communicator 118. The lens communicator 118 transmits and receives data by a serial communication with a camera communicator 204 provided in the camera 2. The lens communicator 118 transmits object distance information of the ranging area extracted as an information display target and coordinate information of the ranging area (position information) to the camera communicator 204.

The focus detection calculator 106, the lens controller 107, the object distance calculator 114, the object distance storage part 115, the object velocity calculator 116, the ranging area extracting part 117, and the lens communicator 118 are included in a lens CPU 130.

Reference numeral 119 indicated by a dotted line in FIG. 1 denotes an exclusion ranging area selecting switch (SW) which is used in the embodiment described below.

In camera 2, a signal outputted from the CCD 201 is inputted to a video signal processor 202. The video signal processor 202 performs various kinds of processes for the signal outputted from the CCD 201 to generate a video signal (a shot image). The video signal is outputted to an image synthesizer (an output image generator) 203.

The object distance information and the ranging area coordinate information inputted from the lens apparatus 1 via the camera communicator 204 are inputted to the image synthesizer 203. The image synthesizer 203 generates an output video signal (an output image) by synthesizing the video signal with the object distance information. Specifically, the output image superimposed with the object distance information at a position dependent on the ranging area coordinate information in the shot image. The position dependent on the ranging area coordinate information is preferably a position where a distance from the ranging area is equal to or less than ⅕ of a screen diagonal length, a position where at least a part of the object distance information is superimposed with the ranging area, or a position where all of the object distance information is included in the ranging area. The output video signal is outputted to a display part 205 or an outside of the camera 2.

The video signal processor 202, the image synthesizer 203, and the camera communicator 204 are included in a camera CPU 210.

Figure 4:
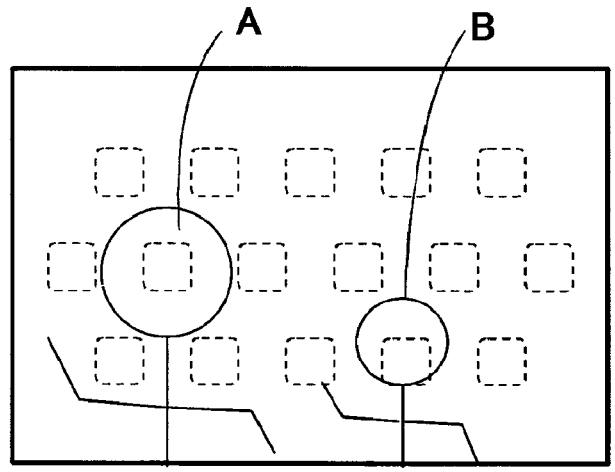
FIG. 4 is a view showing an example of a shot image in Embodiment 1.

FIG. 4 shows a shot image of a marathon in a case where ranging areas 1 to 16 shown in FIG. 3 (indicated by dot lines in the drawing) are set. In the embodiment, a condition where a runner A who leads the race and a runner B who runs behind the runner A are shot is shown. The runner A is positioned at a distance of 20 meters from the lens apparatus 1, and the runner B is positioned at distances of 30 meters from the lens apparatus 1.

In the present embodiment, as an extraction condition, a condition that is suitable for a shot composition shown in FIG. 4 is set. As one of shot configurations in a marathon live, there is a configuration where a broadcasting van runs at a constant distance from a runner to take an image of the runner from the broadcasting van. In this case, a rough distance range from the lens apparatus 1 in which the runner can exist is easily obtained. Therefore, in the present embodiment, a condition that the velocity of a runner with respect to the lens apparatus 1 is in a predetermined velocity range (first range: hereinafter referred to as a velocity range SA) is set as the extraction condition. The velocity range SA is a range of a relative velocity between the lens apparatus 1 and the runner.

The object velocity obtained in a ranging area where a runner exists among the ranging areas 1 to 16 is included in the velocity range (in the first range) that is a constant range. On the other hand, the object velocity obtained in a ranging area where a runner does not exist is considerably different from (higher than) an object velocity obtained in the ranging area where a runner exists. Therefore, if the velocity range SA is set in accordance with a shot condition, a runner that is a shot target (main object) and other objects can be distinguished.

In the present embodiment, the velocity range SA is set between −10 m/sec and 10 m/sec. In this case, an object (a ranging area) that has a velocity between a velocity slower by 10 m/sec and a velocity higher by 10 m/sec than a velocity of an object in a certain ranging area (an object in a ranging area that is a target of a focus control) is included in the velocity range SA. The velocity range SA can be changed.

Figure 5:
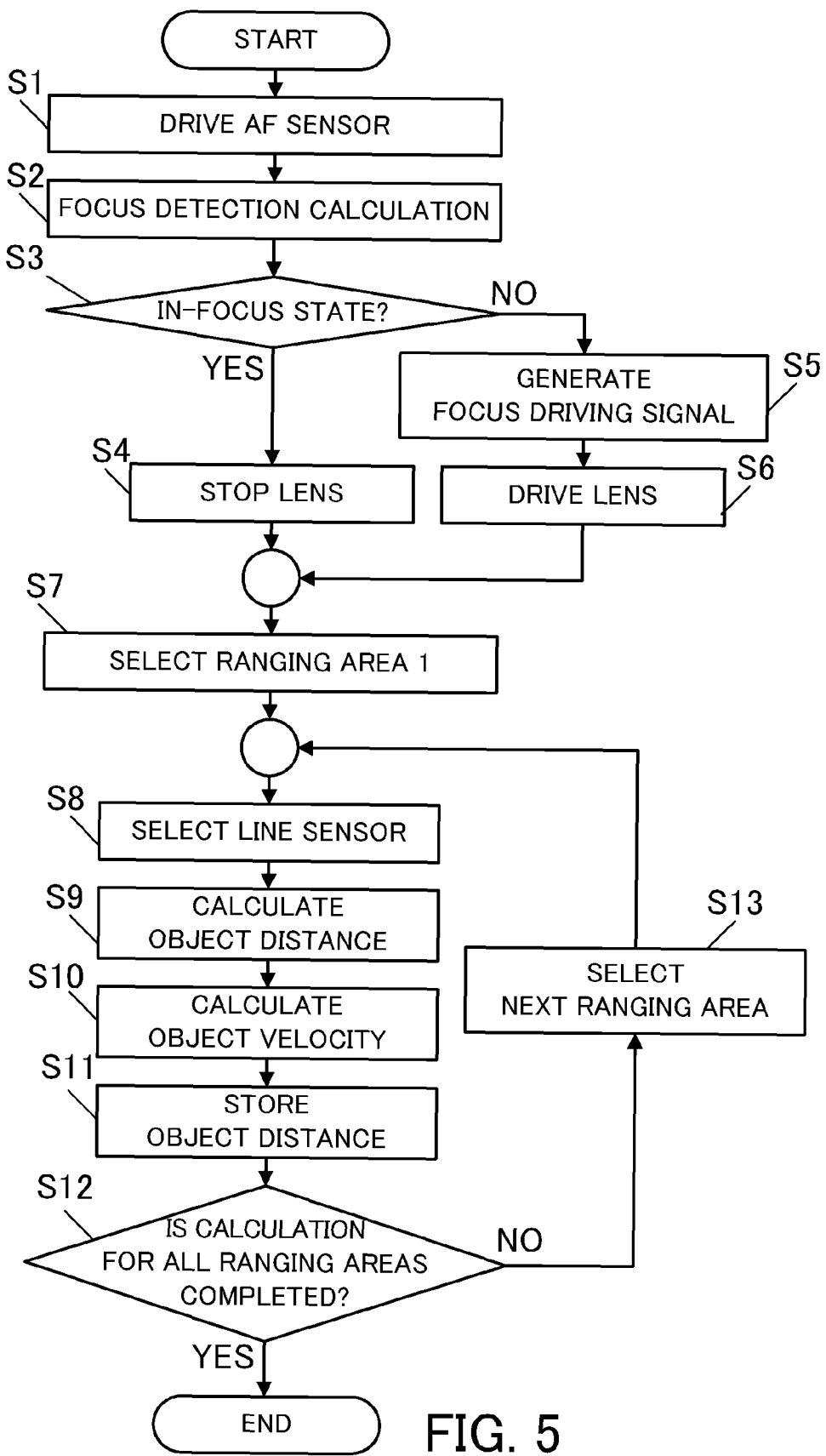
FIG. 5 is a flowchart showing a flow of an AF process and a calculation process of an object distance and an object velocity in Embodiment 1.

The flowchart of FIG. 5 shows a flow of an AF process and calculation processes of an object distance and an object velocity in the lens apparatus 1. The lens CPU 130 controls these processes in accordance with a computer program stored in a memory (not shown).

When the power of the lens apparatus 1 is turned on, the process of the lens CPU 130 proceeds to Step S1 to drive the AF sensor 120 of the focus detector 105. Then, in Step S2, the focus detection calculator 106 calculates a defocus value based on a phase difference obtained by each pair of line sensors 121. The lens controller 107 selects the smallest defocus value out of a plurality of defocus values inputted from the focus detection calculator 106 as an AF defocus value.

Next, in Step S3, the lens controller 107 checks a current focus lens position by using the focus position detector 108 to determine whether or not the AF defocus value is a value in an in-focus range. When the AF defocus value is a value in the in-focus range, the lens controller 107 identifies the current state as an in-focus state to proceed to Step S4 to maintain stopping the focus lens. Then, the process of the lens CPU 130 proceeds to Step S7.

On the other hand, when the AF defocus value is not in the in-focus range, the lens controller 107 proceeds to Step S5 to calculate an in-focus lens position based on the AF defocus value and the current focus lens position. Then, the lens controller 107 generates a focus driving signal which is given to the focus driver 109 to move the focus lens to the in-focus lens position.

Next, in Step S6, the lens controller 107 outputs the focus driving signal to the focus driver 109. Thus, the focus motor 110 is driven and the focus driving ring 102 rotates, and the focus lens moves to the in-focus lens position. Then, the process of the lens CPU 130 proceeds to Step S7.

In Step S7, first, the object distance calculator 114 selects the ranging area 1 out of the ranging areas 1 to 16 shown in FIG. 3.

Next, in Step S8, the object distance calculator 114 selects a pair of line sensors used for the ranging calculation out of the plurality of pairs of line sensors 121 included in the selected ranging area. Specifically, the object distance calculator 114 performs a correlation calculation for obtaining a degree of coincidence of two image signals outputted from each pair of line sensors 121. Then, a pair of line sensors which has the highest degree of coincidence of the two images is selected as a pair of line sensors for ranging.

In Step S9, the object distance calculator 114 calculates an object distance in the selected ranging area using a defocus value obtained based on a phase difference between the two image signals from the pair of line sensors for ranging and the current focus lens position and the magnification-varying lens position.

In Step S10, the object velocity calculator 116 calculates an object velocity based on a difference between the current object distance obtained by the object distance calculator 114 and the previous object distance stored in the object distance storage part 115 for each ranging area.

In Step S11, the object distance storage part 115 stores the object distance in each ranging area obtained by the object distance calculator 114.

In Step S12, the object distance calculator 114 determines whether or not the calculation of the object distances and the object velocities in all the ranging areas 1 to 16 is completed. If the calculation is not completed, the process proceeds to Step S13 to select the next ranging area to repeat the process of Steps S8 to S11. If the calculation of the object distances in all the ranging areas is completed, the process is finished.

Figure 6:
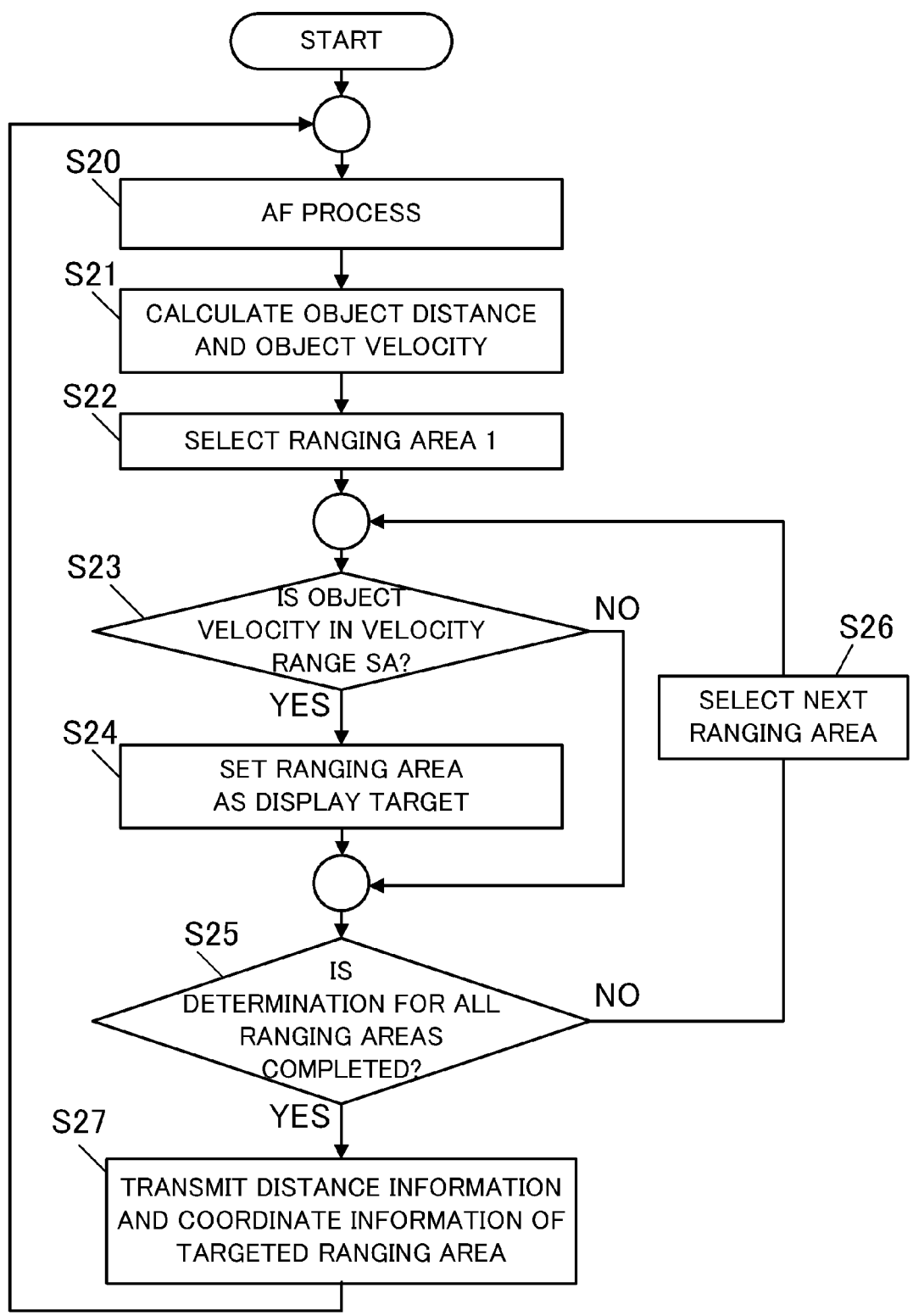
FIG. 6 is a flowchart showing a flow of a ranging area extraction process in Embodiment 1.

The flowchart of FIG. 6 shows a flow of a ranging area extraction process performed by the lens apparatus 1. The lens CPU 130 controls the process in accordance with a computer program stored in a memory (not shown).

When the AF process in Steps S1 to S6 of FIG. 5 is performed in Step S20 and further the calculation processes of the object distances and the object velocities in all the ranging areas in Steps S7 to S13 in Step S21, the process proceeds to Step S22.

In Step S22, first, the ranging area extracting part 117 in the lens CPU 130 selects the ranging area 1 out of the ranging areas 1 to 16 shown in FIG. 3.

Next, in Step S23, the ranging area extracting part 117 determines whether or not the object velocity of the selected ranging area is in the velocity range SA, i.e. whether or not the ranging area is an information display target. When the object velocity of the selected ranging area is in the velocity range SA, the process proceeds to Step S24 to set the ranging area as a ranging area that is the information display target. Then, the process by the lens CPU 130 proceeds to Step S25. On the other hand, when the object velocity of the selected ranging area is not in the velocity range SA, it is determined that the ranging area is not the information display target, and the process proceeds to Step S25.

In Step S25, the ranging area extracting part 117 determines whether or not the determination of the information display target with respect to all the ranging areas 1 to 16 is completed. If the determination is not completed, the process proceeds to Step S26 to select the next ranging area to repeat the process of Steps S23 to S25. If the determination of the information display target with respect to all the ranging areas is completed, the process proceeds to Step S27.

Figure 7:
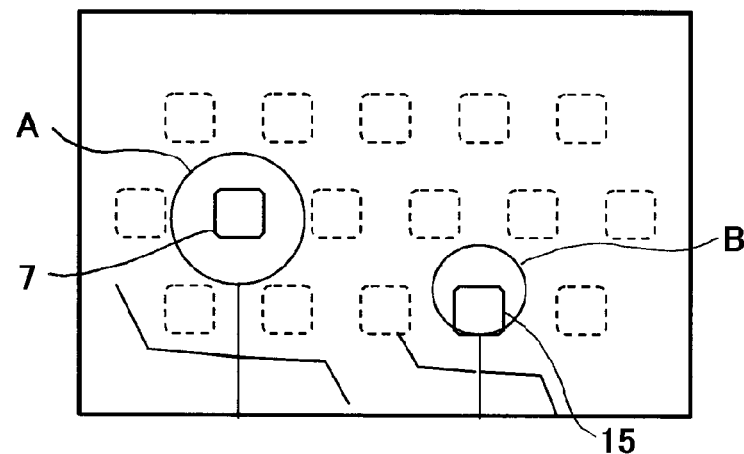
FIG. 7 is a view showing an example of setting a target by a velocity range SA in Embodiment 1.

In the process described above, the extraction of the ranging area by the velocity range SA is completed. The situation where the extraction of the ranging area by the velocity range SA is performed in the shot composition shown in FIG. 4 is shown in FIG. 7. When the velocity range is set between −10 m/sec and 10 m/sec, the ranging areas (indicated by solid lines) 7 and 15 which cover the runner A and the runner B that are main objects are set as information display targets. On the other hand, the ranging areas (indicated by dotted lines) which cover the background that is another object are out of the information display targets.

In Step S27, the ranging area extracting part 117 transmits object distance information and coordinate information of each of the ranging areas 7 and 15 set as the information display targets to the camera 2 via the lens communicator 118. When the transmission is completed, the lens CPU 130 repeats the process from Step S20 again.

Figure 8:
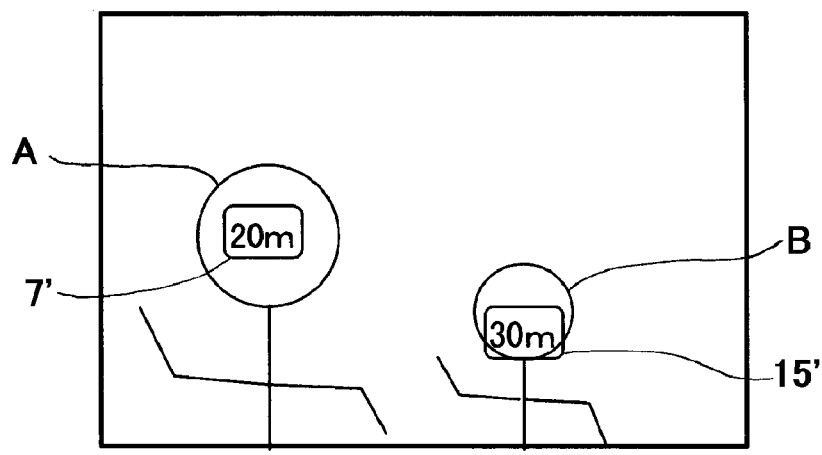
FIG. 8 is a view showing a display example of distance information in Embodiment 1.

In FIG. 8, an output image generated by the image synthesizer 203 of the camera 2 which has received the object distance information and the coordinate information of the ranging area is shown. The output image is displayed on the display part 205 or is outputted outside the camera 2 to broadcast. This is true for other embodiments described below. The AF is performed so as to focus the runner A.

In the shot image generated by the camera 2, letters "20m" and "30m" indicating the object distances are superimposedly displayed at positions 7' and 15' corresponding to the ranging areas 7 and 15 set as the information display targets, i.e. positions depending on the coordinate information.

Thus, in the present embodiment, the velocity range SA that is an extraction condition of the information display target are set in advance to be able to display the object distance of only the object for which the distance display is to be performed out of a plurality of objects along with the shot image. In other words, even if a camera operator does not operate to select the object, the ranging area, or the like, the object or the ranging area for which the distance display (information display) is performed can be automatically selected. Therefore, the distance to a runner can be easily indicated without a focusing operation for ranging by the camera operator in a marathon live.

In the present embodiment, when a plurality of pairs of line sensors are included in each ranging area, a pair of line sensor which has the highest degree of coincidence of two image signals is selected and the object distance is calculated based on a phase difference obtained by using the pair of line sensors. However, a method of calculating the object distance is not limited to this.

For example, a plurality of object distances are calculated based on phase differences obtained by each of the plurality of pairs of line sensors in each ranging area, and the average value of the object distances may be the object distance in the ranging area. With respect to the plurality of object distances obtained by using the plurality of line sensors provided in each ranging area, the weighting depending on the position of the line sensor may also be performed to select or generate one object distance in accordance with a predetermined regulation from the weighted objected distance.

In the present embodiment, the case where the velocity range SA is previously set has been described, but a method of setting the velocity range SA is not limited to this. For example, an object velocity in a ranging area used for a current focus control may also be calculated to set the velocity range SA as a reference of the object velocity.

In the present embodiment, the case where the object distance information and the coordinate information for each ranging area set as the information display target are transmitted to the camera 2 via the lens communicator 118 has been described. However, the object velocity information and the coordinate information for each ranging area may also be transmitted to the camera 2. In this case, the object velocity calculator 116 functions as an information generator, and a letter indicating the object velocity is superimposedly displayed at a position corresponding to the ranging area set as the information display target in a shot image generated by the camera 2. Instead of this, the information of a difference between the object distances (relative distance) or a difference between the object velocities (relative velocity) may also be transmitted to the camera 2 to display the relative distance or the relative velocity between a top runner and a second runner, for example at a position of the second runner.

At least two of the object velocity, the difference between the object distances, and the difference between the object velocities may also be superimposedly displayed on the shot image at the same time or by switching them.

In the present embodiment, the case where a serial communication is performed between the lens apparatus 1 and the camera 2 has been described, but a communicating method is not limited to this. This is true for other embodiments described below.

In the present embodiment, in a marathon live, a shot condition that a broadcasting van runs at a constant distance from a runner to take an image from the broadcasting van. Therefore, the obtained object velocity is a relative velocity between the broadcasting van (the lens apparatus 1) and the runner. However, an absolute velocity can be obtained by inputting the velocity of the broadcasting van from an outside to the lens apparatus 1 to add the velocity to the relative velocity, and the absolute velocity can be superimposedly displayed on the shot image. This is true for other embodiments described below.

In the present embodiment, the case where the image taking system is installed on the broadcasting van to take an image of the runner has been described, but the present invention can also be applied to the case where the image taking system is fixed on a ground to take an image. In this case, setting appropriately the velocity range SA enables the image taking system to distinguish a runner with an object other than the runner to automatically extract a ranging area that is an information display target. Further, when the image taking system is fixed on the ground to take an image, an object velocity as an absolute velocity can be obtained. Therefore, in a track and field live or a horse racing live, when taking an image of a runner or a horse from the image taking system fixed on the ground or the like, the present invention can be applied to a variety of image taking conditions. This is true for other embodiments described below.

In addition, a ranging system shown in the present embodiment is a so-called TTL type ranging system which includes the focus detector 105 inside the lens apparatus and uses light from an image taking optical system, but the present invention is not limited to this. For example, the object distance to an object in a ranging area may be measured by using a ranging sensor (an external measuring sensor) for an external measurement (receiving light from an optical system different from the image taking optical system of the lens apparatus) which is provided outside the lens apparatus. This is true for other embodiments described below.

Embodiment 2

Embodiment 2 of the present invention will be described with reference to FIGS. 9 to 13. In a marathon, it is often the case that a plurality of runners run as a group. When shooting (taking an image) is performed for the group of runners, it is often the case that the group of runners is covered by two or more ranging areas. In this case, in the extraction condition described in Embodiment 1, if there are two or more ranging areas which satisfy the condition of the velocity range SA, the distance display is performed for all the ranging areas and an output image which is not clear is provided. In the present embodiment, an extraction condition suitable for the case will be described.

Figure 9:
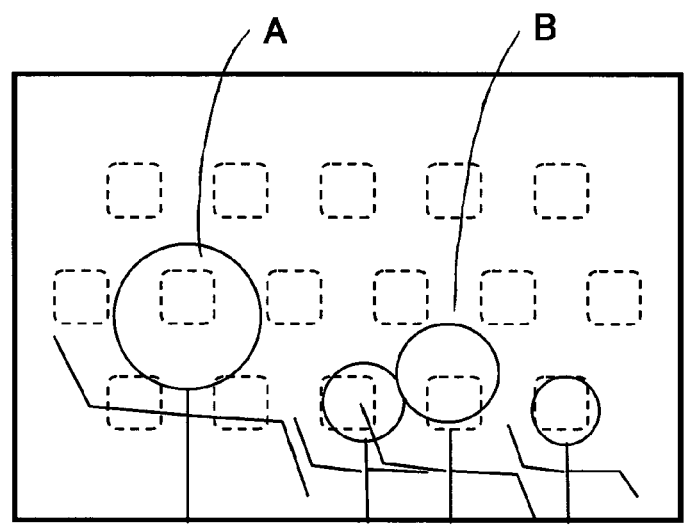
FIG. 9 is a view showing an example of a shot image in Embodiment 2 of the present invention.

In FIG. 9, a shot image including a plurality of runners who run as a group is shown. Similarly to the case of Embodiment 1, the plurality of runners are shot from a broadcasting van. In the embodiment, a runner A who leads the race and a second group B including three runners who runs behind the runner A are shot. The runner A is positioned at a distance of 20 meters from the lens apparatus 1, and runs at a relative velocity of 0 m/sec with respect to the lens apparatus 1. The runners included in the group B are positioned at a distance of 31 meters, 30 meters, and 32 meters, in order from the left runner, and runs at relative velocities of 3.3 m/sec, 3.0 m/sec, and 3.7 m/sec, respectively, with respect to the lens apparatus 1. In other words, each runner included in the following group B is catching up with the runner A.

When the two or more ranging areas cover the same runner or a group of runners whose velocity differences are small (the "distance difference" is a point in Embodiment 3), performing only one distance display is sufficient. Therefore, in the present embodiment, a range (a second range: hereinafter referred to as a velocity range SB) of a predetermined velocity difference where covering the same runner or the group of runners can be determined is also set as an extraction condition. The velocity range SB is a range of a difference between object velocities calculated in each ranging area. In the present embodiment, the velocity range SA is set between −10 m/sec and 10 m/sec, and the velocity range SB is set between −1 m/sec and 1 m/sec. These velocity ranges SA and SB can be arbitrarily changed.

Among the ranging areas set as information display targets by the velocity range SA, the ranging areas where a velocity difference in the velocity range SB (in the second range) is calculated are regarded as one group, and a representative one ranging area is selected from each group. Thus, the group is divided into a group including the runners A who leads the race and a group including the group B, and one distance display is performed for each group.

The configuration of the image taking system, the configuration of the AF sensor, and the arrangement of the ranging area in the present embodiment are the same as those shown in FIGS. 1 to 3 of Embodiment 1, and elements common to those of Embodiment 1 are denoted by the same reference numerals as those of Embodiment 1.

Figure 10:
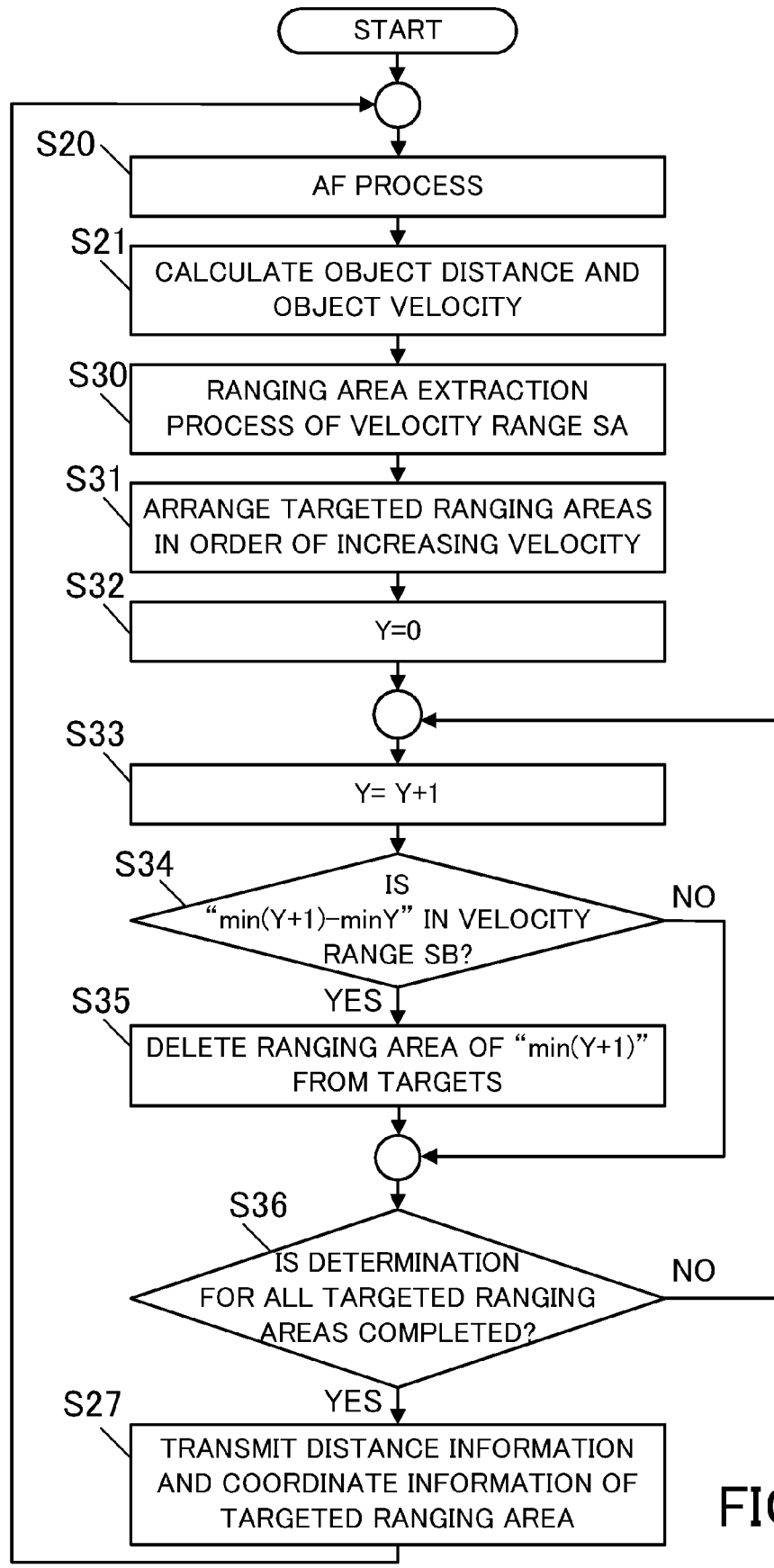
FIG. 10 is a flowchart showing a flow of a ranging area extraction process in Embodiment 2.

The flowchart of FIG. 10 shows a flow of a ranging area extraction process by the lens CPU 130 of the present embodiment. The lens CPU 130 controls the process in accordance with a computer program stored in a memory (not shown).

In Steps S20 and S21, as shown in FIG. 6 of Embodiment 1, the lens CPU 130 performs an AF process and a calculation processes of the object distance and the object velocity.

Next, in Step S30, similarly to Steps S22 to S26 of Embodiment 1, the ranging area extracting part 117 performs an extraction process of a ranging area by the velocity range SA.

Figure 11:
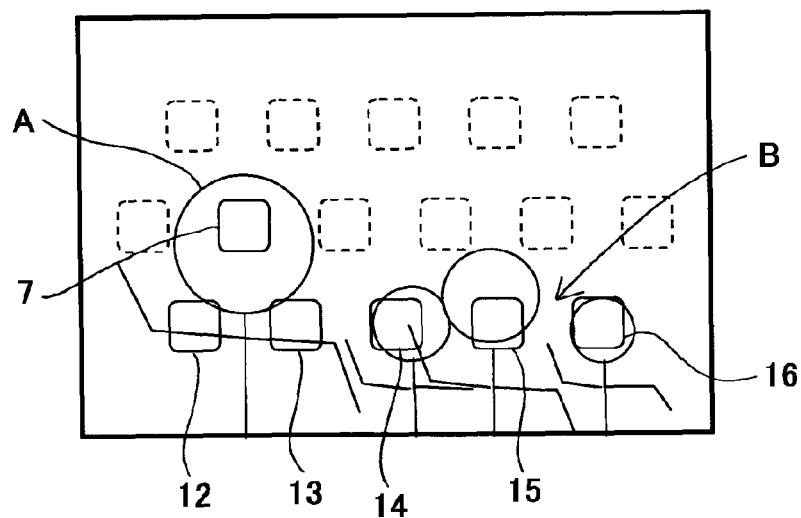
FIG. 11 is a view showing an example of setting a target by a velocity range SA in Embodiment 2.

In the process described above, the extraction of the ranging area by the velocity range SA is completed. The situation where the extraction of the ranging area by the velocity range SA is performed in the shot composition shown in FIG. 9 is shown in FIG. 11. The ranging areas 7 and 12 to 16 (indicated by solid lines) which cover the runner A and the group B that are main objects are set as information display targets, and the ranging areas (indicated by dotted lines) which cover the background that is another object are out of the information display targets.

Next, the extraction of the ranging area by the velocity range SB will be described. In Step S31, the ranging area extracting part 117 lays the ranging areas set as information display targets by the velocity range SA in order of increasing the object velocity. In the embodiment, the ranging area of the slowest object velocity is defined as min1, and in order of increasing the object velocity, the ranging areas are defined as mint, mina, and the like. Hereinafter, a number added after each of "min" (1, 2, 3, . . . ) is defined as a variable Y.

In Step S32, the ranging area extracting part 117 substitutes an initial value of zero into Y. Next, in Step S33, the ranging area extracting part 117 increments the value of Y by one.

Next, in Step S34, the ranging area extracting part 117 calculates a difference between the object velocities of minY and min(Y+1) (hereinafter, referred to simply as a velocity difference) to determine whether or not the velocity difference is in the velocity range SB. If it is in the velocity range SB, the process proceeds to Step S35 to exclude the ranging area of min(Y+1) from the information display targets and the process proceeds to Step S36. On the other hand, if the velocity difference is not in the velocity range SB, the process proceeds to Step S36 while maintaining setting the ranging area of min(Y+1) as the information display target.

In Step S36, the ranging area extracting part 117 determines whether or not the determination of the velocity range SB with respect to all ranging areas that are information display targets by the velocity range SA is completed. If the determination is not completed, the process returns to Step S33 to repeat the process of Step S33 to S36. If the determination is completed, the process proceeds to Step S27.

Figure 12:
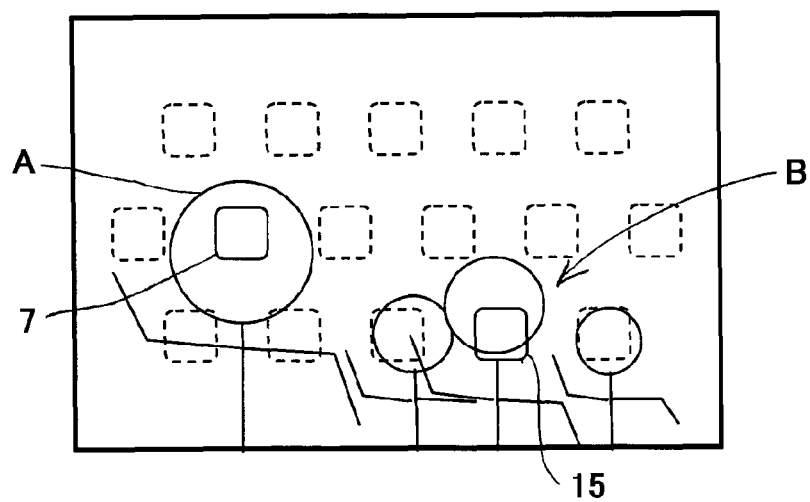
FIG. 12 is a view showing an example of setting a target by a velocity range SB in Embodiment 2.

In the above process, the extraction of the ranging areas by the velocity range SB is completed. In FIG. 12, the ranging areas 7 and 15 which have been extracted as final information display targets by the velocity range SB out of the ranging areas that are information display targets shown in FIG. 11 are shown. The ranging areas 12 and 13 (indicated by dotted lines) are excluded from the information display targets because the velocity difference with respect to the ranging area 7 is small, i.e. because they are ranging areas which cover the same object. Further, the ranging areas 14 and 16 (indicated by dotted lines) are excluded from the information display targets because the velocity difference with respect to the ranging area 15 is small, i.e. because they are ranging areas which cover a group of runners. Therefore, for the group including the runner A and the group including the group B, the ranging areas 7 and 15 (indicated by solid lines) are set as final information display targets, respectively.

In Step S27, similarly to the case of Embodiment 1, the ranging area extracting part 117 transmits object distance information and coordinate information of each of the ranging areas 7 and 15 set as the information display targets to the camera 2 via the lens communicator 118. When the transmission is completed, the lens CPU 130 repeats the process from Step S20 again.

Figure 13:
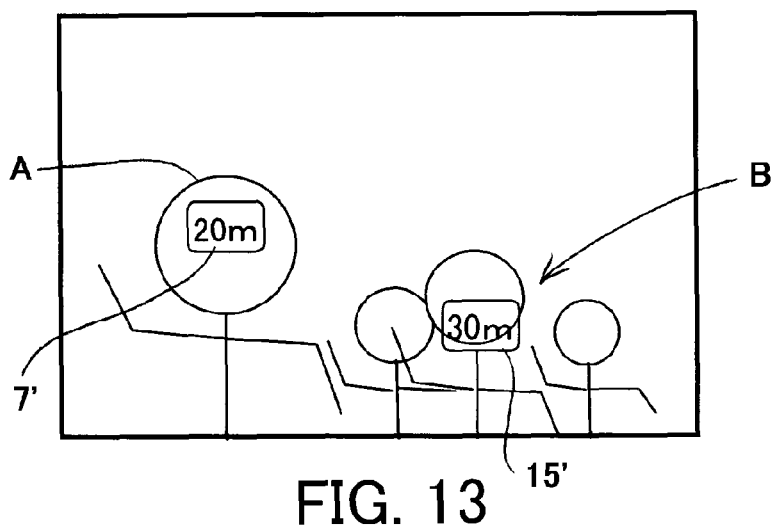
FIG. 13 is a view showing a display example of distance information in Embodiment 2.

In FIG. 13, an output image generated by the image synthesizer 203 of the camera 2 which has received the object distance information and the coordinate information is shown. The AF is performed so as to focus the runner A. In the shot image generated by the camera 2, letters "20m" and "30m" indicating the object distances are superimposedly displayed at positions 7' and 15' corresponding to the ranging areas 7 and 15 set as the information display targets, i.e. positions depending on the coordinate information.

In the present embodiment, the velocity ranges SA and SB that is extraction conditions are set in advance, and a plurality of ranging areas satisfying the velocity range SA are divided into a plurality of groups which have velocities different from one another (each of which satisfies the velocity range SB). Then, a ranging area representing each group is set as the information display target to be able to display one object distance along with the shot image for each group.

In the present embodiment, the case where a ranging area whose object velocity is the slowest among two or more ranging areas is set as the information display target when there are the two or more ranging areas which satisfy the velocity range SB has been described. However, a ranging area where a head of a runner whose object velocity is comparatively stable (for example, the uppermost part of an image-taking screen) may also be set as the information display target. Instead of this, an average of the object velocities in the two or more ranging areas maybe the object velocity of these ranging areas.

Embodiment 3

Embodiment 3 of the present invention will be described with reference to FIGS. 11, 12, and 14. In the present embodiment, as an extraction condition, in addition to the velocity range SA described in Embodiment 1, a distance range (a third range) C is provided and a ranging area included in the distance range C (in the third range) is regarded as one group. Then, a representative one ranging area is set as an information display target and other ranging areas are excluded from the information display target. Thus, similarly to the case of Embodiment 2, a group is divided into a group including a runner A who leads the race and a group including a group B (there are two or more ranging areas which satisfy the ranging area SA), and one distance display is performed for each group.

The distance range C is a range of difference of the object distance calculated in each ranging area (hereinafter, referred to simply as a distance difference). In the present embodiment, the velocity range SA is set between −10 m/sec and 10 m/sec, and the distance range C is set between 0 and 2 meters. The velocity range SA and the distance range C can be arbitrarily changed.

The configuration of the image taking system, the configuration of the AF sensor, and the arrangement of the ranging areas in the present embodiment are the same as those shown in FIGS. 1 to 3 of Embodiment 1, and elements common to those of Embodiment 1 are denoted by the same reference numerals as those of Embodiment 1.

Figure 14:
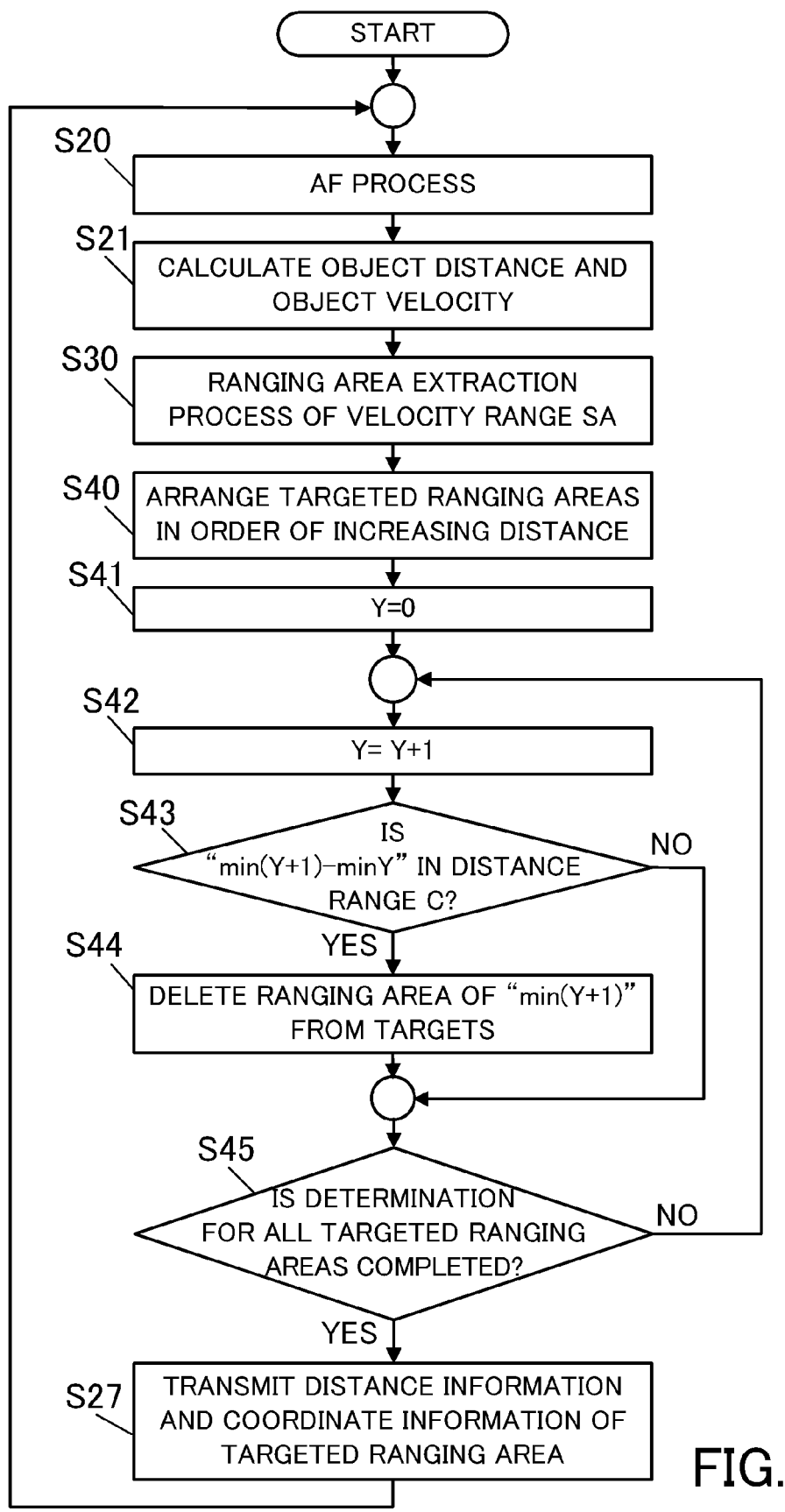
FIG. 14 is a flowchart showing a flow of a ranging area extraction process in Embodiment 3 of the present invention.

A flowchart of FIG. 14 shows a flow of a ranging area extraction process by the CPU 130 of the present embodiment. The lens CPU 130 controls the process in accordance with a computer program stored in a memory (not shown).

In Steps S20 and S21, as shown in FIG. 6 of Embodiment 1, the lens CPU 130 performs an AF process and calculation processes of an object distance and an object velocity.

Next, in Step S30, similarly to Steps S22 to S26 of Embodiment 1, the ranging area extracting part 117 performs an extraction process by the velocity range SA.

Next, in Step S40, the ranging area extracting part 117 lays the ranging areas set as information display targets by the velocity range SA in order of increasing the object distance. In the embodiment, the ranging area of the shortest (the closest) object distance is defined as min1, and in order of increasing the object distance, the ranging areas are defined as min2, min3, and the like. Hereinafter, a number added after each of "min" (1, 2, 3, . . . ) is defined as a variable Y.

Next, in Step S41, the ranging area extracting part 117 substitutes an initial value of zero into Y. Next, in Step S42, the ranging area extracting part 117 increments the value of Y by one.

Next, in Step S43, the ranging area extracting part 117 calculates a distance difference between "min(Y+1)" and "minY" to determine whether or not the distance difference is in the distance range C. If it is in the distance range C, in Step S44, the ranging area of min(Y+1) is excluded from the information display target and the process proceeds to Step S45. On the other hand, if the distance difference is not in the distance range C, the process proceeds to Step S45 while maintaining setting the ranging area of min(Y+1) as the information display target.

In Step S45, the ranging area extracting part 117 determines whether or not the determination of the distance range C with respect to all ranging areas that are information display targets by the velocity range SA is completed. If the determination is not completed, the process returns to Step S42 to repeat the process of Step S42 to S45. If the determination is completed, the process proceeds to Step S27.

In the above process, the extraction of the ranging areas by the distance range C is completed. Because the ranging areas 12 and 13 among ranging areas which have been information display targets by the velocity range SA shown in FIG. 11 have small distance difference with respect to the ranging area 7, i.e. they are ranging areas which covers the same object, they are excluded from the information display targets as shown in FIG. 12. Further, because the ranging areas 14 and 16 have small distance difference with respect to the ranging area 15, i.e. they are ranging areas which cover a group, they are excluded from the information display targets. Therefore, in a group including the runner A and a group including the group B, the respective ranging areas (indicated by solid lines) 7 and 15 are finally set as the information display targets.

In Step S27, similarly to the case of Embodiment 2, the ranging area extracting part 117 transmits object distance information and coordinate information of each of the ranging areas 7 and 15 set as the information display targets to the camera 2 via the lens communicator 118. When the transmission is completed, the lens CPU 130 repeats the process from Step S20 again.

Similarly to the case of Embodiment 2, an output image generated by the image synthesizer 203 of the camera 2 which has received the object distance information and the coordinate information is shown in FIG. 13. In the shot image generated by the camera 2, letters "20m" and "30m" indicating the object distances are superimposedly displayed at positions 7' and 15' corresponding to the ranging areas 7 and 15 set as the information display targets.

In the present embodiment, the velocity range SA and the distance range C that are extraction conditions are set in advance, and a plurality of ranging areas satisfying the velocity range SA are divided into a plurality of groups which have distances different from each other (each of which satisfies the distance range C). Then, a ranging area representing each group is set as the information display target to be able to display one object distance along with the shot image for each group.

In the present embodiment, the case where a ranging area having the shortest object distance among two or more ranging areas is set as the information display target when there are the two or more ranging areas which satisfy the distance range C has been described. However, a ranging area where a head of a runner whose object distance is comparatively stable (for example, the uppermost part of an image-taking screen) may also be set as the information display target. Instead of this, an average of the object distances in the two or more ranging areas may be the object distance of these ranging areas.

According to each of the above embodiments, a main object can be automatically selected out of a plurality of objects which have velocities different from each other, and object information such as the distance to the main object or the velocity of the main object can be displayed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a ranging area that is finally to be a information display target may be set in combination with the extraction conditions described in Embodiments 1 to 3. In order to deal with a variety of shot compositions, the extraction conditions described in Embodiments 1 to 3 may also be selectively set in accordance with the operation of an operating member such as a switch.

In a marathon, because the shot composition is roughly determined in advance, a position where a spectator on the side road is shot is predictable. When the spectator on the side road is running along with a runner, there is a possibility that the distance display is performed for the spectator. The distance display for the spectator can be prevented by excluding the ranging area at a position where the spectator is shot from the information display targets. In this case, as shown by a dotted line in FIG. 1, an exclusion ranging area selecting switch (selector) 119 for arbitrarily selecting a ranging area (exclusion ranging area) excluded from the information display target by a camera operator is preferably provided.

Further, in the present invention, the case where the object distance calculator 114, the object distance storage part 115, the object velocity calculator 116, and the ranging area extracting part 117 are provided inside the lens apparatus 1 has been described, but at least one of them may also be provided in the camera 2. Further, the object distance calculator 114, the object distance storage part 115, the object velocity calculator 116, and the ranging area extracting part 117 may be provided at an external device constituting a part of the image taking system, which is different from the lens apparatus 1 and the camera 2.

This application claims the benefit of Japanese Patent Application No. 2008-283930, filed on Nov. 5, 2008, which is hereby incorporated by reference herein in its entirety.

What is claimed is:

1. An image taking system including a lens apparatus and a camera configured to take an image using the lens apparatus, the image taking system further comprising a controller configured to provide:
   a distance calculator task that calculates an object distance from the lens apparatus in each of a plurality of ranging areas provided in an image taking range;
   a velocity calculator task that calculates an object velocity based on the object distance calculated by the distance calculator task in each of the plurality of ranging areas, the object velocity being a relative velocity between the lens apparatus and an object;
   an information generator task that generates object information indicating at least one of the object distance calculated by the distance calculator task, a difference between two object distances among a plurality of object distances calculated by the distance calculator task, the object velocity calculated by the velocity calculator task, or a difference between the object velocities;
   an extractor task that extracts a ranging area where the object velocity calculated by the velocity calculator task is in a first range out of the plurality of ranging areas, the first range including a state where the object velocity is zero; and
   an output image generator task that generates an output image including a shot image generated by the camera and the object information corresponding to the ranging area extracted by the extractor task.

2. An image taking system according to claim 1, wherein:
   the controller is further configured to provide a ranging position output task that outputs position information that indicates a position of each of the ranging areas, and
   the output image generator task generates the output image by superimposing the object information corresponding to the ranging area extracted by the extractor task at a position depending on the position information in the shot image.

3. An image taking system according to claim 1, wherein when the object velocity calculated by the velocity calculator task is in the first range and the difference between the object velocities in at least two ranging areas is in a second range, the extractor task extracts one ranging area out of the at least two ranging areas.

4. An image taking system according to claim 1, wherein when the object velocity calculated by the velocity calculator task is in the first range and the difference between the two object distances calculated by the distance calculator task in at least two ranging areas is in a third range, the extractor task extracts one ranging area out of the at least two ranging areas.

5. An image taking system according to claim 1, further comprising:
   a selector configured to select at least one exclusion ranging area out of the plurality of ranging areas,
   wherein the extractor task excludes the exclusion ranging area out of the ranging areas as extracting targets where the object velocity calculated by the velocity calculator task is in the first range.

6. A lens apparatus comprising a controller configured to provide:
   a distance calculator task that calculates an object distance from the lens apparatus in each of a plurality of ranging areas provided in an image taking range;
   a velocity calculator that calculates an object velocity based on the object distance calculated by the distance calculator task in each of the plurality of ranging areas, the object velocity being a relative velocity between the lens apparatus and an object;
   an information generator task that generates object information indicating at least one of the object distance calculated by the distance calculator task, a difference between two object distances among a plurality of object distances calculated by the distance calculator task, the object velocity calculated by the velocity calculator task, or a difference between the object velocities; and
   an extractor task that extracts a ranging area where the object velocity calculated by the velocity calculator task is in a first range out of the plurality of ranging areas, the first range including a state where the object velocity is zero.

7. A lens apparatus according to claim 6, wherein:
the controller is further configured to provide a ranging position output task that outputs position information that indicates a position of each of the ranging areas, and
the output image generator task outputs the output image by superimposing the object information corresponding to the ranging area extracted by the extractor task at a position depending on the position information in the shot image to an outside of the lens apparatus.

8. A lens apparatus according to claim 6, wherein when the object velocity calculated by the velocity calculator task is in the first range and the difference between the object velocities in at least two ranging areas is in a second range, the extractor task extracts one ranging area out of the at least two ranging areas.

9. A lens apparatus according to claim 6, wherein when the object velocity calculated by the velocity calculator task is in the first range and the difference between the two object distances calculated by the distance calculator task in at least two ranging areas is in a third range, the extractor task extracts one ranging area out of the at least two ranging areas.

10. A lens apparatus according to claim 6, further comprising:
a selector configured to select at least one exclusion ranging area out of the plurality of ranging areas,
wherein the extractor task excludes the exclusion ranging area out of the ranging areas as extracting targets where the object velocity calculated by the velocity calculator task is in the first range.

11. A lens apparatus according to claim 6, further comprising:
a phase difference sensor configured to detect a phase difference between object images formed by light entering the lens apparatus,
wherein the distance calculator task calculates the object distance based on an output from the phase difference sensor.

12. A lens apparatus according to claim 11, wherein the controller is further configured to provide a focus control task that performs a focus control based on the output from the phase difference sensor.

13. A lens apparatus according to claim 6, further comprising:
an external measuring sensor configured to detect a phase difference between object images by using an optical system other than an image taking optical system of the lens apparatus,
wherein the distance calculator task calculates the object distance based on an output from the external measuring sensor.

14. A lens apparatus according to claim 13, wherein the controller is further configured to provide a focus control task that performs a focus control based on the output from the external measuring sensor.

15. A lens apparatus according to claim 12, wherein the extractor task sets the first range based on the object velocity in a ranging area used for the focus control.

* * * * *

UNITED STATES PATENT AND TRADEMARK OFFICE
CERTIFICATE OF CORRECTION

PATENT NO. : 8,405,718 B2
APPLICATION NO. : 12/613332
DATED : March 26, 2013
INVENTOR(S) : Shingo Isobe et al.

It is certified that error appears in the above-identified patent and that said Letters Patent is hereby corrected as shown below:

In the Claims:

Column 16, Line 54 (In Claim 6, line 6), please revise as follows:

a velocity calculator --task-- that calculates an object velocity

Signed and Sealed this
Fourteenth Day of May, 2013

Teresa Stanek Rea
*Acting Director of the United States Patent and Trademark Office*